United States Patent
Pan et al.

(10) Patent No.: US 10,854,065 B1
(45) Date of Patent: Dec. 1, 2020

(54) FAN FILTER REPLACEMENT MECHANISM

(71) Applicant: Quanta Computer Inc., Taoyuan (TW)

(72) Inventors: Kai-Yeh Pan, Taoyuan (TW);
Chun-Ching Yu, Taoyuan (TW);
Hsi-Han Lin, Taoyuan (TW);
Shuen-Hung Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/711,148

(22) Filed: Dec. 11, 2019

Related U.S. Application Data

(60) Provisional application No. 62/883,909, filed on Aug. 7, 2019.

(51) Int. Cl.
*G08B 21/18* (2006.01)
*G01N 15/08* (2006.01)

(52) U.S. Cl.
CPC ....... *G08B 21/182* (2013.01); *G01N 15/0806* (2013.01); *G01N 2015/084* (2013.01)

(58) Field of Classification Search
None
See application file for complete search history.

(56) References Cited

U.S. PATENT DOCUMENTS

| | | | |
|---|---|---|---|
| 2010/0017151 A1* | 1/2010 | Kerrigan | B01D 46/0086 702/47 |
| 2013/0276629 A1* | 10/2013 | Salahshour | B01D 46/0086 95/25 |
| 2016/0266560 A1* | 9/2016 | Chou | G05B 19/042 |

* cited by examiner

*Primary Examiner* — Thomas S McCormack
(74) *Attorney, Agent, or Firm* — Nixon Peabody LLP

(57) ABSTRACT

An electronic device including a housing configured to house one or more electronic components, an air filter, a fan disposed within the housing, and an air pressure sensor disposed within the housing is disclosed. The air filter is disposed within an air inlet defined by the housing. The fan is configured to cause air to enter the housing via the air inlet such that the air flows through the air filter and within the housing. The air pressure sensor generates data used to determine air pressure values within the housing that are based at least in part on the air flowing through the air filter and within the housing. Based on the determined air pressure values from the air pressure sensor, a status of the air filter can be determined, and an indication that the air filter is in need of replacement can be generated and transmitted to a user.

15 Claims, 3 Drawing Sheets

FAN FILTER REPLACEMENT MECHANISM

CROSS-REFERENCE TO RELATED APPLICATIONS

This application claims priority under 35 U.S.C. § 119 to U.S. Provisional Application No. 62/883,909, entitled "FAN FILTER REPLACEMENT MECHANISM", and filed on Aug. 7, 2019. The contents of that application are hereby incorporated by reference herein in their entirety.

TECHNICAL FIELD

The present disclosure relates generally to systems and methods for determining the status of an air filter in a server or other electronic device. More particularly, aspects of this disclosure relate to an arrangement of air pressure sensors disposed within a housing of an electronic device, and a method of monitoring the air pressure in the housing of the electronic device to determine if the air filter needs to be replaced.

BACKGROUND

Electronic devices, such as servers or storage devices, can include a number of electronic components disposed within a housing. FIG. 1 is a perspective view of a typical electronic device 10 that includes electronic components 12 disposed within a housing 14. The electronic components 12 can include integrated circuits that are highly sensitive to temperature, particulate matter in the environment, and other factors. While the electronic device 10 is operating, the electronic components 12 generate heat. Fans 16 cause air to flow through the housing 14 to keep the electronic components 12 cool. The housing 14 defines at least one inlet 18 and at least one outlet (not shown) that allow air to flow through the housing 14. When active, the fans 16 cause air to flow into the housing 14 through the inlet 18, and out of the housing 14 through the outlet. The air flowing through the housing 14 (denoted by arrows A) cools the electronic components 12 and prevents the electronic components 12 from overheating.

However, particulate matter such as dust, dirt, or other airborne debris can enter the housing 14 through the inlet 18 and the outlet. This particulate matter can negatively affect the performance of the electronic components 12. For example, a buildup of particulate matter within the housing 14, near the inlet 18, or near the outlet can reduce the amount of air that flows through the housing 14. The reduction in airflow can cause the electronic components 12 to overheat and lead to poor performance and even operational failure. Thus, there is a need for systems and methods that can effectively cool down the electronic components disposed within the housing of an electronic device, without negatively affecting the performance of the electronic components.

SUMMARY

The various examples of the present disclosure are directed toward an electronic device and methods of monitoring an electronic device. In a first embodiment of the present disclosure, the electronic device comprises a housing, an air filter, a fan, and an air pressure sensor. The housing is configured to house one or more electronic components, and defines an air inlet. The air filter is disposed within the air inlet. The fan is configured to cause air to enter the housing via the air inlet, such that the air flows through the air filter and within the housing. The air pressure sensor is disposed within the housing, and is configured to generate data indicative of an air pressure in a respective region within the housing. The air pressure within the respective region is based at least in part on the air flowing through the air filter and through the respective region within the housing.

In some examples of the first embodiment, the electronic device further comprises a controller and a memory device. The controller is configured to control operation of the fan and operation of the air pressure sensor. The memory device is configured to store the generated data from the air pressure sensor.

In some examples of the first embodiment, the controller is configured to determine, at a first time, an initial air pressure value from the air pressure sensor based on the generated data.

In some examples of the first embodiment, the initial air pressure value from the air pressure sensor is based at least partially on air flowing through the air filter and within the housing, when the air filter is initially installed in the air inlet of the housing.

In some examples of the first embodiment, the controller is configured to determine one or more subsequent air pressure values from the air pressure sensor based on the generated data. Each of the one or more subsequent air pressure values being is at a second time or later, with the second time being after the first time.

In some examples of the first embodiment, the one or more subsequent air pressure values from the air pressure sensor comprise a plurality of subsequent air pressure values determined during a period of time after the air filter is initially installed in the air inlet of the housing.

In some examples of the first embodiment, the controller is configured to determine an average air pressure value from the air pressure sensor based on the plurality of subsequent air pressure values from the air pressure sensor.

In some examples of the first embodiment, the controller is configured to determine a difference between: (i) the average air pressure value from the air pressure sensor; and (ii) the initial air pressure value from the air pressure sensor.

In some examples of the first embodiment, the controller is configured to generate and transmit a status notification indicative of a need to replace the air filter, in response to the difference being greater than a threshold value.

In some examples of the first embodiment, the average air pressure value from the air pressure sensor is a running average air pressure value, and the plurality of subsequent air pressure values comprises a set number of most recent air pressure values.

In some examples of the first embodiment, the controller is configured to generate and transmit a status notification indicative of a status of the air filter. The status notification is based at least in part on: (i) the one or more subsequent air pressure values from the air pressure sensor; and (ii) the initial air pressure value from the air pressure sensor.

In some examples of the first embodiment, the controller is configured to determine the initial air pressure value from the air pressure sensor when the fan is operating at a specific duty cycle. The controller is further configured to determine the one or more subsequent air pressure values from the air pressure sensor when the controller operates the fan at the specific duty cycle.

In some examples of the first embodiment, the fan is disposed within the housing.

In some examples of the first embodiment, the controller is configured to determine a difference between (i) at least one of the one or more subsequent air pressure values from the air pressure sensor and (ii) the initial air pressure value from the air pressure sensor.

In some examples of the first embodiment, the controller is configured to generate and transmit a status notification indicative of a need to replace the air filter, in response to the difference being greater than a threshold value.

In a second embodiment of the present disclosure, a method of monitoring a status of an air filter disposed within an air inlet of a housing of an electronic device is disclosed. The method includes determining an initial air pressure value from an air pressure sensor that is disposed within the housing. The initial air pressure value from the air pressure sensor is based at least partially on air flowing through the air filter and the housing at a first time. The method further includes determining one or more subsequent air pressure values from the air pressure sensor. The one or more subsequent air pressure values are based at least partially on air flowing through the air filter and the housing at a second time after the first time. The method further includes comparing the one or more subsequent air pressure values from the air pressure sensor to the initial air pressure value from the air pressure sensor. The method further includes transmitting a status notification indicative of the status of the air filter. The status notification is based on the comparison between the one or more subsequent air pressure values from the air pressure sensor and the initial air pressure value from the air pressure sensor.

In some examples of the second embodiment, comparing (i) the one or more subsequent air pressure values from the air pressure sensor to (ii) the initial air pressure value from the air pressure sensor, includes determining an average air pressure value from the air pressure sensor based on the one or more subsequent air pressure values from the air pressure sensor. The method further includes determining a difference between the average air pressure value from the air pressure sensor and the initial air pressure value from the air pressure sensor.

In some examples of the second embodiment, transmitting the status notification includes transmitting an indication of a need to replace the air filter in response to the difference being greater than a threshold value.

In some examples of the second embodiment, the air filter is initially installed in the air inlet of the housing at the first time.

In some examples of the second embodiment, the method further includes repeatedly determining a plurality of subsequent air pressure values from the air pressure sensors over a time period. The method further includes continually determining a running average air pressure value from the air pressure sensor for the time period.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
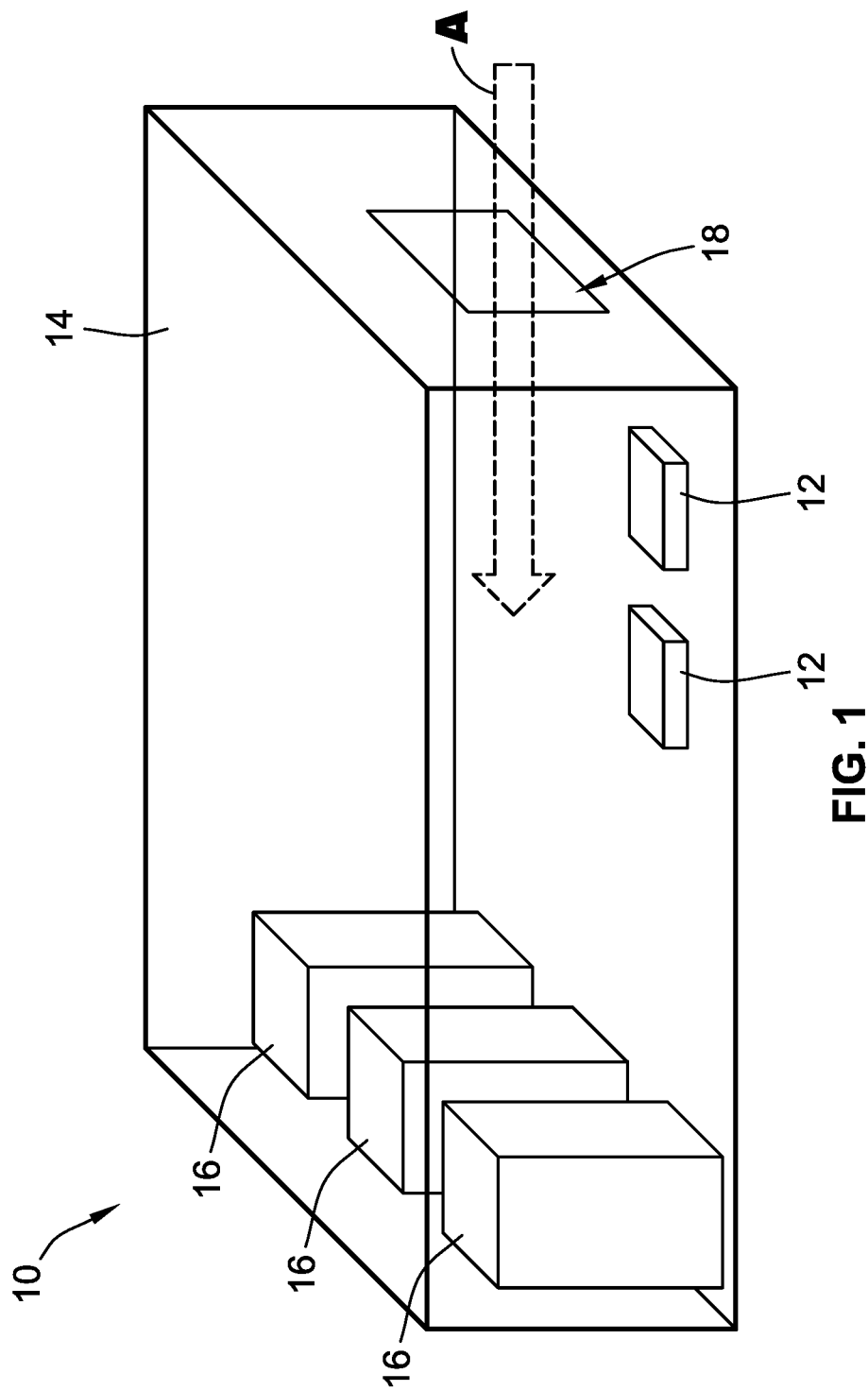
FIG. 1 is an axonometric view of a conventional electronic device using one or more fans to cool internal electronic components, according to aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 2:
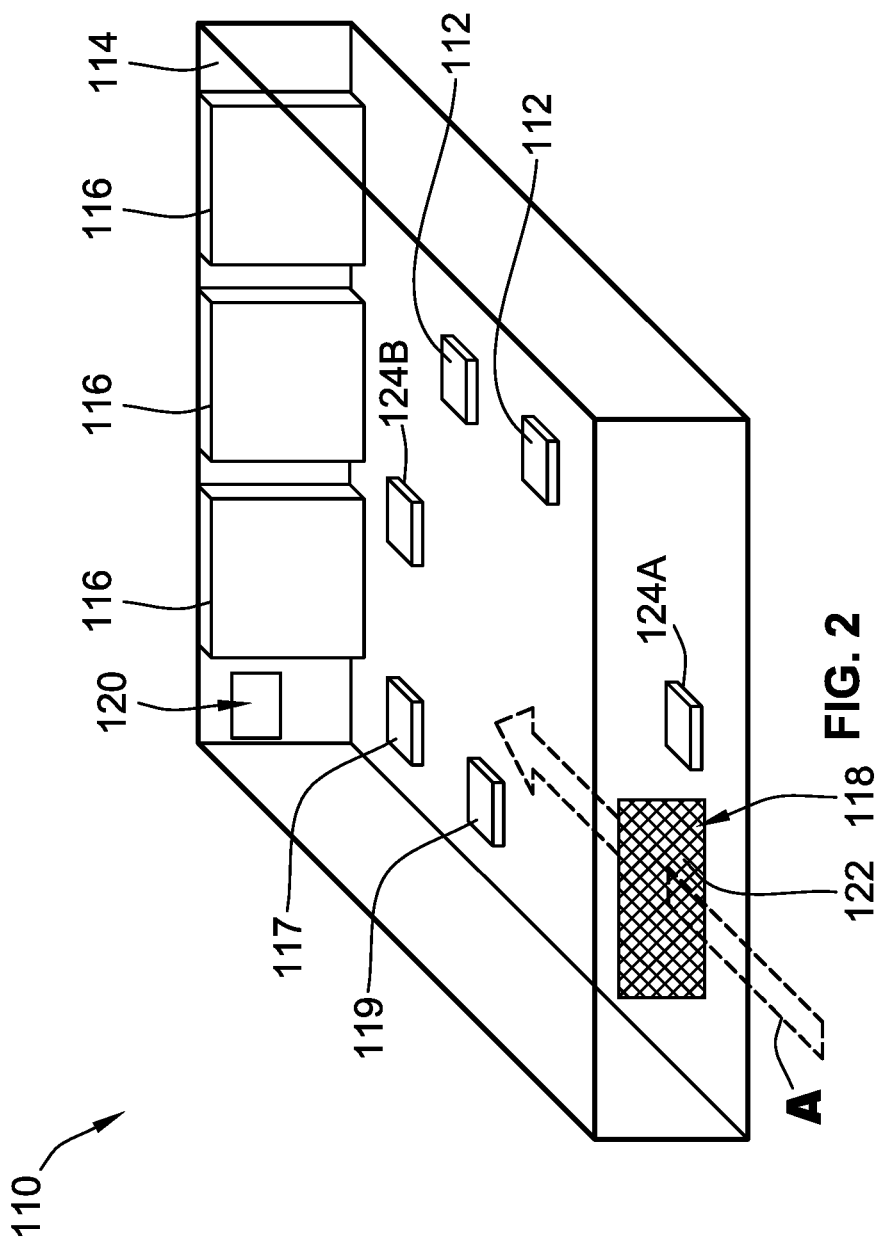
FIG. 2 is an axonometric view of an electronic device using air pressure sensors disposed within a housing to monitor the status of an air filter disposed within an air inlet of the housing, according to aspects of the present disclosure.

FIG. 2 shows a perspective view of an electronic device 110. The electronic device 110 is similar to the electronic device 10 in FIG. 1, and includes one or more electronic components 112 disposed within a housing 114. The electronic device 110 includes one or more fans 116. An inlet 118 and an outlet 120 are defined in the housing 114. Operation of the fans 116 causes air to flow into the housing 114 through the inlet 118, and out of the housing 114 through the outlet 120. The flow of the air into the housing 114 is denoted by arrows A. The electronic device 110 can also include a controller 117 and a memory device 119 that control operation of the fans 116. In some implementations, the controller 117 and the memory device 119 are dedicated components that perform functions related only to the fans 116. In other implementations, the controller 117 and the memory device 119 are general purpose components that perform other functions related to the operation of the electronic device 110.

The electronic device 110 further includes an air filter 122 that is mounted in the inlet 118. The air filter 122 prevents particulate matter from entering the housing 114 through the inlet 118. The air filter 122 thus allows the fans 116 to cool the electronic components 112 without the risk of particulate matter entering the housing 114 and negatively affecting the performance of the electronic components 112.

In the example implementation illustrated in FIG. 2, the fans 116 are disposed within the housing 114. However, in other implementations, the fans 116 can be disposed outside of the housing 114, or disposed partially inside and partially outside of the housing 114. Additionally, any suitable number of fans 116 can be used to cool the electronic components 112. Moreover, FIG. 2 shows that air flows in a single direction through the housing 114. However, the housing 114, the fans 116, the inlet 118, and the outlet 120 can be designed to produce any desirable air flow within the housing 114.

The electronic device 110 also includes one or more air pressure sensors 124A, 124B that are disposed within the housing 114. The air pressure sensors 124A, 124B generate data that is indicative of the air pressure within the housing 114. The air pressure itself is related to the amount of air flowing within the housing 114. The controller 117 can determine individual air pressure values from the air pressure sensors 124A, 124B. The air pressure values from the air pressure sensors 124A, 124B are based on the data generated by and received from the air pressure sensors 124A, 124B. The controller 117 uses the air pressure values to monitor the air flow within the housing 114.

The amount of air flowing within the housing 114 can be used to determine the status of the air filter 122. While the air filter 122 prevents particulate matter from entering the housing 114, particulate matter can build up on the air filter 122 itself. This built-up particulate matter can reduce the amount of air that flows through the air filter 122, which in turn reduces the amount of cooling achieved by the fans 116. When the particulate matter reduces the amount of air flowing through the air filter 122, the air pressure values from the air pressure sensors 124A, 124B decrease. Thus, the controller 117 can detect when the built-up particulate matter is interfering with the ability of the fans 116 to cool down the electronic components 112, and can provide an indication that the air filter 122 needs to be cleaned or replaced.

The controller 117 controls the operation of the air pressure sensors 124A, 124B. For example, the controller 117 can turn the air pressure sensors 124A, 124B on and off. The controller 117 can also can set the frequency at which the air pressure sensors 124A, 124B generate data related to the air pressure within the housing 114. The controller 117 determines individual air pressure values based on the generated data, and stores the air pressure values in the memory device 119. The controller 117 can monitor these air pressure values to determine the status of the air filter 122.

For example, if particulate matter builds up on the air filter 122, the amount of air flowing into the housing 114 through the inlet 118 will be reduced. The reduced air flow into the housing 114 will cause the air pressure within the housing 114 to decrease as compared to when the air filter 122 is free of particulate matter. The controller 117 compares the current air pressure values to one or more reference air pressure values to detect the decreased air flow. If the difference between the current air pressure value and the reference air pressure value is greater than a threshold value, the controller 117 can generate and/or transmit a notification of the status of the air filter 122. The notification can indicate to a user of the electronic device 110 that the air filter 122 needs to be cleaned and/or replaced. The notification can have any suitable form, such as an audio notification, a message being transmitted or displayed, a light or other physical indicator being activated, etc.

Generally, the air pressure sensors 124A, 124B are disposed at different regions within the housing 114. The air pressure values that are determined from each air pressure sensor 124A, 124B are indicative of the amount of air flowing through the respective regions within the housing 114 of each air pressure sensor 124A, 124B. For example, air pressure sensor 124A can be disposed near the inlet 118, and air pressure sensor 124B can be disposed near the outlet 120. The air pressure values that are determined from air pressure sensor 124A are indicative of the amount of air flowing in the housing 114 near the inlet 118. The air pressure values that are determined from the air pressure sensor 124B are indicative of the amount of air flowing in the housing 114 near the outlet 120.

The controller 117 can also adjust the operation of the fans 116 based on the air pressure values. For example, in some situations, there may be some particulate matter blocking some air flow through the air filter 122. However, this air flow reduction may not be enough to require that the air filter 122 be cleaned or replaced. In these situations, when the controller 117 detects the decrease in the air pressure within the housing 114, the controller 117 can increase the speed at which the fans 116 operate. The increased rotation speed of the fans 116 will increase the amount of air flowing through the housing 114, to counteract the buildup of particulate matter on the air filter 122. In some implementations, the controller 117 increases the rotation speed of the fans 116 by increasing the duty cycle at which the controller 117 operates the fans 116.

The electronic device 110 can have a variety of different configurations. For example, in some implementations, additional air pressure sensors disposed outside of the housing 114 can also be utilized for additional air pressure values. Further, while FIG. 2 only shows two air pressure sensors 124A, 124B, any suitable number of air pressure sensors can be used. For example, an electronic device 110 with a large housing 114 may require more than just the two air pressure sensors 124A, 124B. The actual arrangement of the air pressure sensors 124A, 124B within the housing 114 is flexible. The air pressure sensors 124A, 124B are generally placed at any suitable location there they do not physically interfere with the electronic components 112 or any other component disposed within the housing 114. Further, the fans 116 could be disposed outside of the housing 114, or disposed partially inside the housing 114 and partially outside the housing 114.

Figure 3:
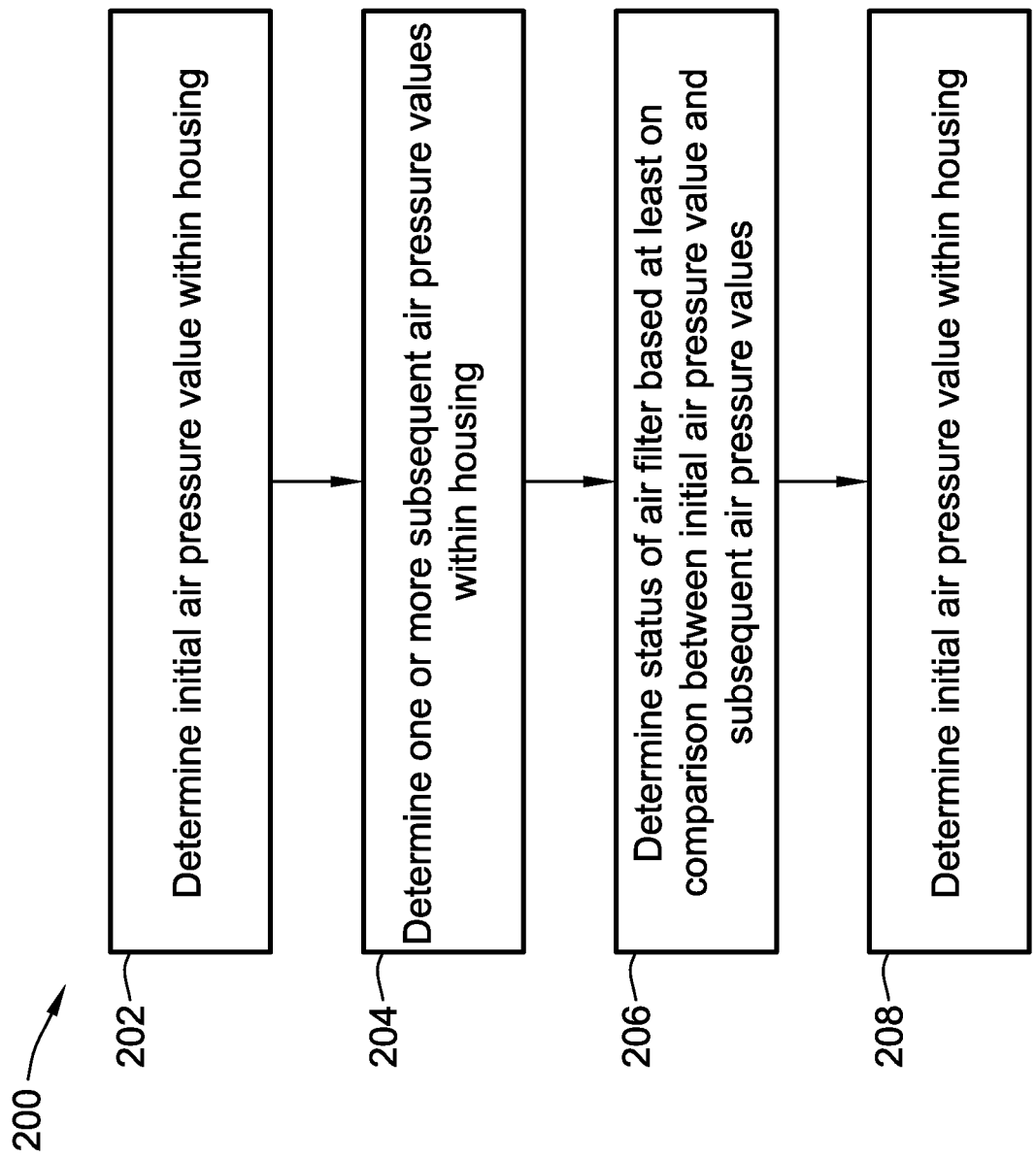
FIG. 3 is a flowchart of a method for monitoring the status of an air filter disposed within an air inlet of a housing of an electronic device, according to aspects of the present disclosure.

FIG. 3 shows a flowchart 200 of steps in an example routine for monitoring the status of the air filter 122 of the electronic device 110 in FIG. 2. At step 202, the controller 117 determines, at a first time, an initial air pressure value from each of the air pressure sensors 124A, 124B. The air pressure values from the air pressure sensors 124A, 124B are based on the data generated by and received from the air pressure sensors 124A, 124B. The initial air pressure values are stored in the memory device 119. These initial air pressure values can be used as the reference air pressure values for comparison to subsequently-obtained air pressure values. Thus, in some implementations, the controller 117 determines the initial air pressure values when the air filter 122 is initially installed in the housing 114. However, in other implementations, air pressure values determined after the air filter 122 has been in use for some time after the initial installation can also be used as the reference air pressure values.

The controller 117 will generally operate the fans 116 at a fixed duty cycle when the initial air pressure values from the air pressure sensors 124A, 124B are determined. This fixed duty cycle generally corresponds to a fixed rotation speed. The controller 117 can then operate the fans 116 at that same fixed duty cycle at later times in order to monitor the status of the air filter 122, e.g., at the same rotational speed. In some implementations, the duty cycle is 80%. Other duty cycles can also be used.

In some implementations, the duty cycle at which the fans 116 are operated to determine the initial and/or subsequent air pressure values is different than the duty cycle at which the fans 116 are operated during normal operation of the electronic device 110. In these implementations, the controller 117 temporarily modifies the duty cycle of the fans 116 in order to determine a subsequent air pressure value. After the data from the air pressure sensors 124A, 124B for the subsequent air pressure values has been received, the duty cycle of the fans 116 is adjusted back to the normal operating value.

In some implementations, the controller 117 always controls the duty cycle of the fans 116, and the controller 117 simply adjusts the duty cycle. In other implementations, a different component of the electronic device 110 (such as another controller or processor) normally operates the fans 116, and the controller 117 temporarily takes control of the fans 116 to adjust the duty cycle.

At step 204, the controller 117 determines one or more subsequent air pressure values from each of the air pressure sensors 124A, 124B at a second time, based on the data received from the air pressure sensors 124A, 124B. In many implementations, the one or more subsequent air pressure values comprise a plurality of subsequent air pressure values. However, in some implementations, only a single subsequent air pressure value can be used. The subsequent air pressure values will be determined during a period of time after the air filter 122 is initially installed. The subsequent air pressure values are thus indicative of the amount of air flowing through the air filter 122 after the air filter 122 is initially installed. Generally, the controller 117 will operate the fans 116 at the same fixed duty cycle when determining the subsequent air pressure values as when the initial air pressure values were determined. As noted above, this fixed duty cycle is 80% in some implementations. Other duty cycles can also be used.

At step 206, the controller 117 determines the status of the air filter 122 based on a comparison between (i) the initial air pressure values from the air pressure sensors 124A, 124B, and (ii) the subsequent air pressure values from the air pressure sensors 124A, 124B. In some implementations, the controller 117 first determines an average air pressure value from each air pressure sensor 124A, 124B. The average air pressure value is based on multiple subsequent air pressure values from each of the air pressure sensors 124A, 124B. The controller 117 then determines the difference between the average air pressure value and the initial air pressure value.

As particulate matter builds up on the air filter 122, the air pressure within the housing 114 will decrease as less air flows through the housing 114. Thus, the difference between the average air pressure value and the initial air pressure value will generally increase as more particulate matter builds up on the air filter 122. Once this difference becomes greater than a predetermined threshold value, the air filter 122 will generally need to be cleaned or replaced.

Generally, the average air pressure values are determined on a sensor-by-sensor basis. Thus, the controller 117 can determine a first average air pressure value based only on the data received from the air pressure sensor 124A, and a second average air pressure value based only on the data received from the air pressure sensor 124B. The first average air pressure value is compared to the subsequent air pressure values from only the air pressure sensor 124A. The second average air pressure value is compared to the subsequent air pressure values from only the air pressure sensor 124B.

In some implementations, a subsequent air pressure value is repeatedly determined for each air pressure sensor 124A, 124B at a predetermined time interval. The average air pressure value from each air pressure sensor 124A, 124B is then continually updated every time another subsequent air pressure value is obtained. For example, this time interval can be 60 seconds. In this example, a new subsequent air pressure value is determined every 60 seconds, and the average air pressure value is updated every 60 seconds. Other time intervals can also be used.

Further, in these or additional implementations, the average air pressure value from each air pressure sensor 124A, 124B is determined over a certain specified time period. Once this time period has ended, the average air pressure value from each air pressure sensor 124A, 124B resets. For example, the time period can be a single day. The average air pressure values from the air pressure sensors 124A, 124B are thus average daily air pressure values. At the end of each day, the average daily air pressure values from each air pressure sensor 124A, 124B are reset, and the controller 117 can begin to calculate new average daily air pressure values.

In these or additional implementations, the average air pressure values are running average air pressure values for the time period. The average air pressures values do not reset at the end of each time period. Instead, the controller 117 continually updates the average air pressure value over the preceding time period. Thus, the plurality of subsequent air pressure values used to determine the average air pressure value generally always comprises a set number of the most recently obtained air pressure values. In the example where the time period is one day (i.e., 24 hours), each time the controller 117 determines a new air pressure value, the controller 117 updates the average air pressure value based on the air pressure values received over the preceding 24 hours. In these implementations, the oldest air pressure value is discarded every time the newest air pressure value is determined.

In these or additional implementations, each subsequent air pressure value is individually compared to the initial air pressure value from each air pressure sensor 124A, 124B. In these implementations, any single subsequent air pressure value resulting in a difference larger than the threshold value can indicate that the air filter 122 needs to be cleaned or replaced.

Finally, at step 208, the controller 117 can generate and transmit a notification of the status of the air filter 122. The status notification is based at least in part on the one or more subsequent air pressure values from each air pressure sensor 124A, 124B, and the initial air pressure value from each air pressure sensor 124A, 124B. For example, the status notification can be based on the comparison between the (i) the initial air pressure values and (ii) either the subsequent air pressure values, or the average air pressure values determined from the subsequent air pressure values. In some implementations, the controller 117 generates and transmits the status notification only if the air filter 122 needs to be cleaned or replaced. In other implementations, the controller 117 also generates and transmits a status notification if the air filter 122 is clean.

In some implementations, the controller 117 can generate and transmit different status notifications based on varying levels of health of the air filter 122. For example, the controller 117 can generate and transmit a status notification every time the comparison indicates that the amount of air flowing through the air filter 122 has decreased by a certain amount, even if the decrease does not indicate that the air filter 122 needs to be cleaned or replaced. Thus, the controller 117 in these implementations can provide more frequent updates as to the status of the air filter 122.

The status notification can be any suitable notification. For example, the status notification can be an audio notification played through a speaker connected to the electronic device 110, a message being displayed on a display of the electronic device 110, a light or other physical indicator coupled to the electronic device 110 being activated, or a message being transmitted via any suitable communication protocol, such as the Internet, a cellular signal, a Bluetooth® signal, etc. Other types of status notifications can also be used.

Generally, the controller 117 monitors each individual air pressure sensor 124A, 124B separately. The subsequent air pressure values from the air pressure sensor 124A are compared only to the initial air pressure value from the air pressure sensor 124A. Similarly, the subsequent air pressure values from the air pressure sensor 124B are compared only to the initial air pressure value based on the data received from the air pressure sensor 124B.

Thus, in some implementations, if the subsequent air pressure values from either the air pressure sensor 124A or the air pressure sensor 124B result in an air pressure difference greater than the threshold value, the controller 117 can generate and transmit the status notification indicating that the air filter 122 needs to be cleaned or replaced. However, in other implementations, the controller 117 can determine different statuses of the air filter 122 based on different results from the different air pressure sensors 124A, 124B. For example, if the air pressure values from only one of the air pressure sensors 124A, 124B results in an air pressure difference greater than the threshold value, the controller 117 can generate and transmit a status notification indicating that the air filter 122 does not currently need to be replaced, but might need to be replace soon.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. An electronic device, comprising:
a housing configured to house one or more electronic components, the housing defining an air inlet;
an air filter disposed within the air inlet;
a fan configured to cause air to enter the housing via the air inlet such that the air flows through the air filter and within the housing;
an air pressure sensor disposed within the housing, the air pressure sensor configured to generate data indicative of an air pressure in a respective region within the housing, the air pressure in the respective region in the housing being based at least in part on the air flowing through the air filter and through the respective region within the housing; and
a controller configured to control operation of the fan, the controller being configured to determine, based on at least the generated data, (i) an initial air pressure value and (ii) an average subsequent air pressure value of a plurality of subsequent air pressure values determined over a time period, a difference between the initial air pressure value and the average subsequent air pressure value being indicative of a status of the air filter.

2. The electronic device of claim 1, further comprising a memory device configured to store the generated data from the air pressure sensor.

3. The electronic device of claim 1, wherein the initial air pressure value from the air pressure sensor is based at least partially on air flowing through the air filter and within the housing at a first time when the air filter is initially installed in the air inlet of the housing.

4. The electronic device system of claim 3, wherein the controller is configured to determine each of the plurality of subsequent air pressure values at a second time or later, the second time being after the first time.

5. The electronic device of claim 1, wherein the controller is configured to generate and transmit a status notification indicative of a need to replace the air filter, in response to a difference between the initial air pressure value and the average subsequent air pressure value being greater than a threshold value.

6. The electronic device of claim 1, wherein the average subsequent air pressure value from the air pressure sensor is a running average air pressure value, and wherein the plurality of subsequent air pressure values comprises a set number of most recent air pressure values.

7. The electronic device of claim 1, wherein the controller is configured to generate and transmit a status notification indicative of the status of the air filter, the status notification being based at least in part on (i) the plurality of subsequent air pressure values from the air pressure sensor and (ii) the initial air pressure value from the air pressure sensor.

8. The electronic device of claim 1, wherein the controller is configured to determine the initial air pressure value from the air pressure sensor when the fan is operating at a specific duty cycle, and wherein the controller is further configured to determine the plurality of subsequent air pressure values from the air pressure sensor when the controller operates the fan at the specific duty cycle.

9. The electronic device of claim 1, wherein the fan is disposed within the housing.

10. The electronic device of claim 1, wherein the controller is configured to determine a difference between (i) at least one of the plurality of subsequent air pressure values from the air pressure sensor and (ii) the initial air pressure value from the air pressure sensor.

11. The electronic device of claim 10, wherein the controller is configured to generate and transmit a status notification indicative of a need to replace the air filter, in response to the difference being greater than a threshold value.

12. A method of monitoring a status of an air filter disposed within an air inlet of a housing of an electronic device, the method comprising:
- determining an initial air pressure value from an air pressure sensor disposed within the housing, the initial air pressure value from the air pressure sensor being based at least partially on air flowing through the air filter and the housing at a first time;
- determining a plurality of subsequent air pressure values from the air pressure sensor over a time period, the plurality of subsequent air pressure values from the air pressure sensor being based at least partially on air flowing through the air filter and the housing at a second time during the time period after the first time;
- determining an average subsequent air pressure value of the plurality of subsequent air pressure values;
- comparing the average subsequent air pressure value from the air pressure sensor to the initial air pressure value from the air pressure sensor; and
- transmitting a status notification indicative of the status of the air filter, the status notification being based on a difference between the average subsequent air pressure value from the air pressure sensor and the initial air pressure value from the air pressure sensor.

13. The method of claim 12, wherein transmitting the status notification includes transmitting an indication of a need to replace the air filter in response to the difference being greater than a threshold value.

14. The method of claim 12, wherein at the first time, the air filter is initially installed in the air inlet of the housing.

15. The method of claim 12,
wherein the average subsequent air pressure value from the air pressure sensor is a running average air pressure value, and wherein the plurality of subsequent air pressure values comprises a set number of most recent air pressure values.

* * * * *